G. R. BIRD.
TIRE FLAP.
APPLICATION FILED MAR. 14, 1921.
1,401,306.
Patented Dec. 27, 1921.
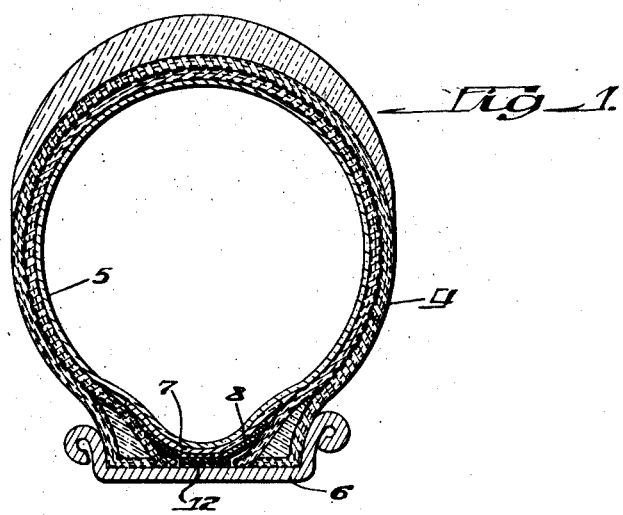
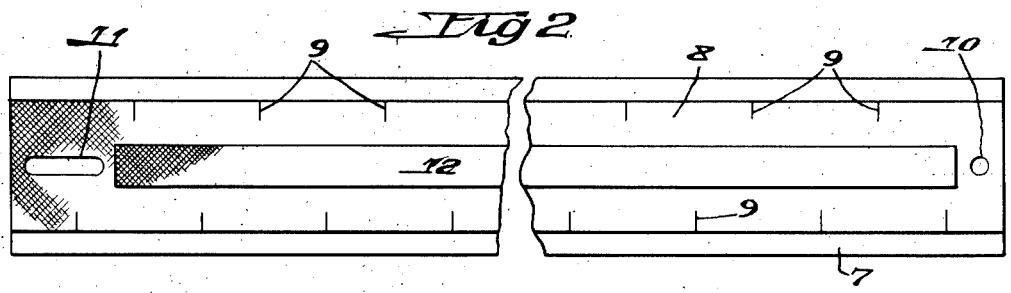
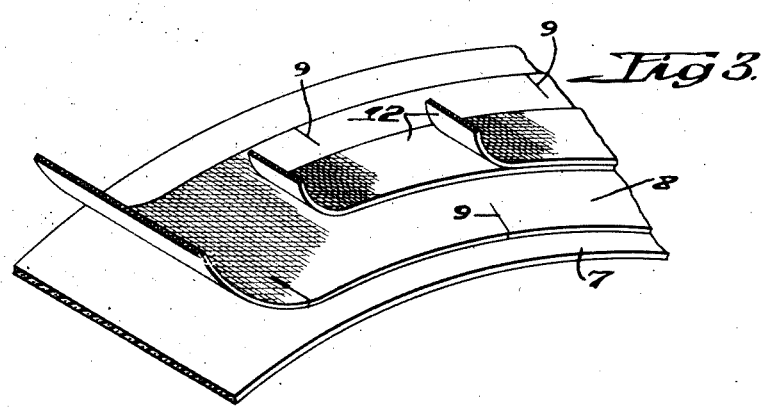
Inventor.
George R. Bird
By Ira J. Wilson
Atty.

UNITED STATES PATENT OFFICE.

GEORGE R. BIRD, OF ROCKFORD, ILLINOIS.

TIRE-FLAP.

1,401,306.

Specification of Letters Patent.  Patented Dec. 27, 1921.

Application filed March 14, 1921. Serial No. 452,193.

*To all whom it may concern:*

Be it known that I, GEORGE R. BIRD, a citizen of the United States, residing at Rockford, in the county of Winnebago and State of Illinois, have invented certain new and useful Improvements in Tire-Flaps, of which the following is a specification.

This invention pertains in general to pneumatic tires, and has more particular reference to what is commonly known as tire flaps. The tire flaps in common and well known use each consists of a strip of fabric, such as canvas, having a valve-receiving hole at each end, which strip is adapted to be placed between the inner tube and the opening between the sides of the tire casing to serve as a protection between the tube and the tire rim, and also as an effectual closure for the casing opening. The flaps being inelastic and flat, often wrinkle and buckle due to their arrangement in circular form within a tire, and consequently cause chafing of the inner tube, which soon results in tire fracture. It follows that due to improper replacement of a flap when changing a tire and to the friction and wear to which the flap is subjected, the flap soon becomes ineffectual for the purposes intended and is invariably the cause of blow-outs and other tire troubles.

The primary object of the present invention is to provide a tire flap of novel construction, which will eliminate the objectionable features of those tire flaps now in common use.

In furtherance of this object, my invention contemplates the provision of a tire flap characterized by a rubber base strip having a fabric backing. The base strip being of substantially the same material as the inner tube forms an ideal protective flap which will not chafe the tube, and the fabric backing in addition to its function as a reinforcing element, is so shaped as to insure against buckling and wrinkling.

I have also aimed to provide an additional reinforcing strip on the backing, consisting of one or more plies of fabric constituting as it were, a narrow rib adapted to fit against the tire rim between the sides of the tire for holding the flap against lateral displacement.

Other objects and attendant advantages will be appreciated by those familiar with this art as the invention becomes better understood by reference to the following description when considered in connection with the accompanying drawing, in which—

Figure 1 is a cross-sectional view through a pneumatic tire and rim with which is associated a tire flap embodying my invention;

Fig. 2, a view looking at the back of the tire flap with the intermediate portion broken away; and Fig. 3, a fragmentary perspective view showing the different plies of one form of my invention.

A conventional tire casing 4, inner tube 5 and rim 6 are shown merely for the purpose of illustrating the arrangement and location of a tire flap therewith, it being obvious that the flap is intended for application in the well known manner as a protection for the inner tube 5 inclosing the opening between the sides of the tire.

My improved tire flap consists preferably of a base strip 7 of rubber and a backing 8 of fabric, united by a suitable cement. It will be observed that the backing is of less width than the base, thereby leaving marginal edges of rubber adapted to readily conform to the shape of the tire. The flap is further constructed to accommodate itself to the shape of the tire by slitting the edges of the backing strip, as at 9. The usual valve openings 10 and 11 are provided at the ends of the flap. One or more reinforcing and retaining strips 12 are suitably secured as by cementing, to the backing strip as shown, providing a central rib or raised portion adapted to fit against the tire rim between the sides of the tire casing, as shown plainly in Fig. 1, for preventing lateral shifting and displacement of the flap.

In use, the flap is applied in the usual manner, it being particularly noted, however, that due to its flexible and elastic structure, it readily conforms to the shape of the tire without wrinkling or buckling, thus insuring a smooth cushion seat for the inner tube, and further insuring against any such displacement as might result in injury to the inner tube. By employing an elastic base, such as of rubber, together with a fabric backing, a very durable flap is obtained. By reason of these characteristics, the flap is less liable to get out of shape, and it will serve as a protective medium for the inner tube and will consequently promote a higher degree of tire efficiency.

The fabric backing is preferably of vulcanized material, so that with the rubber base strip, the flap constitutes a waterproof closure for the casing opening, thus eliminating the danger of injury by water to the flap and inner tube.

It is believed that the foregoing conveys a clear understanding of the objects prefaced above, and while I have illustrated and described but a single working embodiment, it should be understood that various changes might be made in details of construction without departing from the spirit and scope of the invention as expressed in the appended claims.

I claim:

1. A tire flap comprising a relatively wide single-ply rubber base strip, and a fabric backing of less width than the base strip and united thereto.

2. A tire flap comprising a rubber base strip and a fabric backing united and being of such width and thickness as to cover and conform to the inner wall of a tire casing at the rim opening, and a relatively narrow fabric rib along the center of the backing adapted to be positioned against the rim between the separated edges of the tire casing for holding the flap against lateral displacement.

3. A tire flap comprising a single-ply rubber base strip and a single-ply fabric backing of less width than said base strip, adapted to be interposed between an inner tube and a tire casing at the rim and to conform of the shape of said casing, and means for holding the tire flap against lateral displacement.

4. A tire flap comprising a rubber base strip, and a fabric backing of less width than said base strip, said backing being slit along its edges.

5. A tire flap comprising a rubber base strip, a woven backing, and a raised portion centrally on the backing for holding the flap against lateral displacement.

6. A tire flap comprising a base strip of elastic material, and a backing of woven inelastic material of less width than the base strip and united thereto as by cementing.

GEORGE R. BIRD.